United States Patent [19]
Okada et al.

[11] Patent Number: 4,656,735
[45] Date of Patent: Apr. 14, 1987

[54] PROCESS FOR PRODUCING AN ELECTROLYTE RETAINING MATRIX OF ELECTRICAL INSULATING LONG FIBERS

[75] Inventors: Hideo Okada, Hitachi; Masato Takeuchi, Katsuta; Sigeru Okabe, Hitachi; Hiroshi Tobita, Kitaibaraki; Shimpei Matsuda, Toukai; Kohki Tamura; Fumito Nakajima, both of Hitachi, all of Japan

[73] Assignee: Hitachi, Ltd., Tokyo, Japan

[21] Appl. No.: 855,103

[22] Filed: Apr. 23, 1986

Related U.S. Application Data

[60] Division of Ser. No. 767,702, Aug. 22, 1985, which is a continuation of Ser. No. 379,915, May 19, 1982, abandoned.

[30] Foreign Application Priority Data

May 20, 1981 [JP] Japan .................................. 56-75026

[51] Int. Cl.$^4$ ............................................ H01M 2/14
[52] U.S. Cl. .................................. 29/623.1; 29/623.5; 429/41; 429/45; 429/16

[58] Field of Search ...................... 429/41, 46, 16, 12, 429/44, 45; 29/623.1, 623.5; 427/115, 126.1, 126.3; 423/119, 600; 264/56

[56] References Cited

U.S. PATENT DOCUMENTS

| 3,481,737 | 12/1969 | Siebenberg et al. | 429/41 |
| 3,878,296 | 4/1975 | Vine et al. | 429/33 X |
| 4,115,632 | 9/1978 | Kinoshita et al. | 429/46 X |
| 4,389,467 | 6/1983 | Singh et al. | 429/41 |
| 4,493,879 | 1/1985 | Kahara et al. | 429/41 |

FOREIGN PATENT DOCUMENTS 0082583 7/1981 Japan .................................. 429/16

Primary Examiner—Anthony Skapars
Attorney, Agent, or Firm—Antonelli, Terry & Wands

[57] ABSTRACT

A fuel cell provided with an electrolyte retaining plate made of electrical insulating long fibers such as lithium aluminate long fibers which have preferably a length of 100 to 400 µm and a diameter of 1 to 4 µm, are interlocked each other and have vacant spaces for filling an electrolyte can be constructed and operated safely without damaging the electrolyte retaining plate for a long period of time.

14 Claims, 1 Drawing Figure

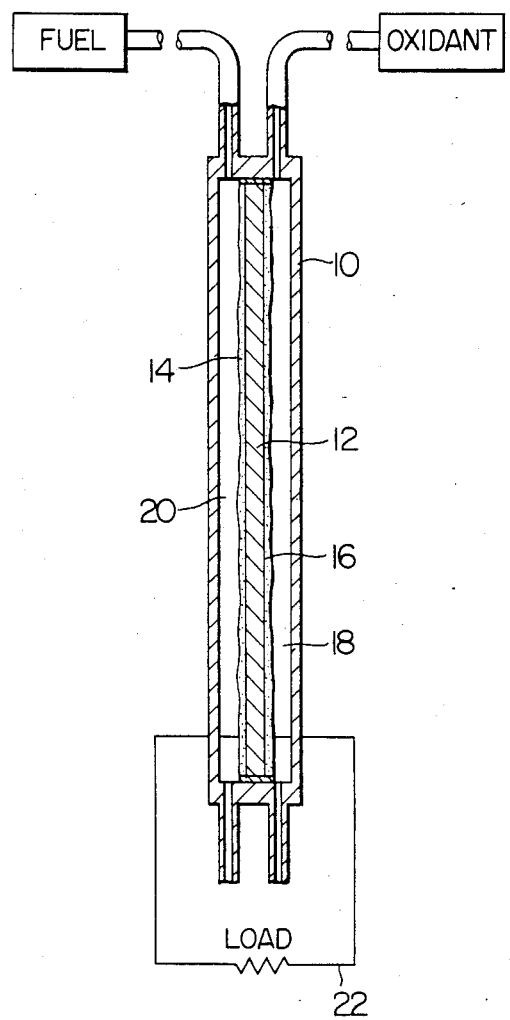

PROCESS FOR PRODUCING AN ELECTROLYTE RETAINING MATRIX OF ELECTRICAL INSULATING LONG FIBERS

This is a division of application Ser. No. 767,702 filed Aug. 22, 1985, which is a continuation application of Ser. No. 379,915 filed May 19, 1982 now abandoned.

This invention relates to a fuel cell, more particularly to a fuel cell provided with an electrolyte plate made of electrical insulating long fibers.

A fuel cell comprises an anode, a cathode and an electrolyte interposed between the two electrodes and converts chemical energy to electric energy directly at the two electrodes by supplying a fuel and an oxidizing agent to the anode side and the cathode side, respectively.

The electrochemical reaction in the fuel cell proceeds at the three-phase interface formed by the electrodes, the electrolyte and the reaction gas, so that improvements for electrolyte plates and electrodes have been made so as to form and maintain good conditions of the three-phase interface to proceed the electrochemical reaction easily.

There have been developed molten carbonate type fuel cells operating at high temperatures, e.g., 500°–800° C., utilizing properties of alkali metal carbonates, such as carbonates of lithium, sodium, potassium, etc., that when these carbonates are heated to high temperatures and melted, their ionic conductivity becomes high. In such a case, the electrochemical reaction proceeds as follows and the ionic conduction is effected by carbonate ions:

Anode: 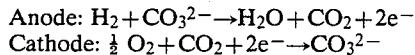

Cathode: $\frac{1}{2} O_2 + CO_2 + 2e^- \rightarrow CO_3^{2-}$

In these fuel cells, the electrolyte is generally retained as mentioned in (1) and (2) below: (1) the electrolyte is impregnated in a porous ceramic sintered body, hereinafter referred to as "matrix type electrolyte body"; and (2) the electrolyte is retained by forming a mixture of an alkali metal carbonate and finely powdered heat resistant material, hereinafter referred to as "paste type electrolyte body".

The matrix type electrolyte body can be obtained by pulverizing magnesia which has been preliminary calcined at 1200°–1400° C., forming a sintered body having a porosity (pore volume) of about 20–55%, and impregnating it with a molten alkali metal carbonate. On the other hand, the paste type electrolyte body can be obtained by, for example, mixing an alkali metal carbonate with a heat resistant material such as magnesia, alumina, zirconia, etc., heat treating the resulting mixture, finely pulverizing the mixture to micron order size, and molding under pressure.

When a fuel cell is constructed by using such electrolyte bodies mentioned above, particularly in the case of the matrix type electrolyte body, it is difficult to completely prevent the sintered body from warpage and waviness during sintering, so that adhesion between the electrolyte body and the electrodes is not always good and preferable three-phase interface can hardly be formed. Further, it is possible that the electrolyte body may be broken in the stage of construction of the fuel cell by interposing the electrolyte body between the anode and the cathode. Even if the fuel cell is constructed, there arise other problems in that cracks are formed on the electrolyte body by heat cycles due to operation and stoppage of the cell and the fuel and the oxidizing agent contact directly (i.e., crossover takes place), which results in lowering the power output or producing a danger of explosion.

On the other hand, in the case of the paste type electrolyte body, adhesion between said electrolyte body and the electrodes is better than the case of the matrix type electrolyte body. But the paste type electrolyte body is not complete from the viewpoint of mechanical strength and the heat resistant material is easily corroded by the molten carbonate during the long time operation, which sometimes results in lowering in electrolyte retaining ability. It is also impossible to completely prevent the electrolyte body from cracking due to the heat cycle.

In order to obtain high cell power output, it is necessary to make the inner resistance of electrolyte remarkably small. In order to attain such an object, there has been desired an electrolyte body having a high electrolyte retaining ability, sufficient mechanical strength even if formed in thin plate and good adhesion to the electrodes.

It is an object of this invention to provide a fuel cell provided with an electrolyte body which is hardly broken and can be used safely even in the form of thin plate.

This invention provide a fuel cell comprising an anode, a cathode and an electrolyte retaining matrix interposed between the electrodes, characterized in that the matrix has self-supporting properties and is made of electrical insulating long fibers interlocking each other and the electrolyte is retained in spaces formed among said fibers.

BRIEF DESCRIPTION OF THE DRAWING

The attached drawing is a cross-sectional view of a fuel cell usable in this invention.

As the electrical insulating long fibers, it is preferable to use inorganic fibers having a length of 100 μm or longer, more preferably 100 to 400 μm, and a ratio of length (l) to diameter (d) (l/d) of 10 or more, more preferably 100 or more. By the use of such long fibers having the length and the l/d ratio as mentioned above and preferably having a diameter of 1 to 4 μm, the matrix has sufficient self-supporting properties and safety causing no damage such as cracks, breaking, etc., during the use. In order to make the mechanical strength of matrix higher, it is preferable to conduct sintering after forming a prescribed shape by interlocking the long fibers each other.

The self-supporting properties can sufficiently be provided by making the l/d ratio of electrical insulating long fibers 100 or more.

When short fibers are used, the self-supporting properties cannot be obtained by interlocking the short fibers themselves, so that it is necessary to press a mixture of an electrolyte material and the short fibers at high temperatures with heating so as to bind the whole. In contrast, when long fibers are used, since the self-supporting properties are obtained by interlocking them two each other, no additional treatment is necessary after retaining the electrolyte material on the matrix. Further, the time for retaining the electrolyte material on the matrix can be selected optionally.

As the electrical insulating long fibers, there can preferably be used inorganic long fibers such as lithium aluminate long fibers, zirconium oxide long fibers and magnesia long fibers. Among them, lithium aluminate long fibers are more preferable.

Lithium aluminate long fibers can be obtained by contacting alumina long fibers with a powdery or liquid lithium salt to conduct heat treatment for forming lithium aluminate. The lithium aluminate fiber is excellent in retaining ability of electrolytes and also excellent in corrosion resistance to alkali metal carbonate electrolytes. Further, since the lithium aluminate fiber is excellent in flexural strength, it is not broken by pressing during the construction of the cell. In addition, adhesion of the electrolyte body using such a lithium aluminate long fiber as matrix to the electrodes is good, so that high power output can be attained.

As the lithium salt which is used in contact with alumina long fibers for heat treatment, there can be used lithium hydroxide, lithium carbonate, lithium nitrate, etc., alone or as a mixture thereof. One or more potassium salts and/or sodium salt and/or other salts may be used together with the lithium salt, so long as the effects of this invention is not lowered.

In the case of contacting the lithium salt with fibrous alumina, fibrous alumina can be dipped in a solution obtaining by dissolving a lithium salt in a solvent, a lithium salt powder can be dusted on fibrous alumina, or a lithium salt is melted by heating and fibrous alumina can be dipped therein. When the fibrous alumina is dipped in a solution of lithium salt, it is preferable to conduct the heat treatment after sufficiently drying the fibrous alumina. When the lithium salt powder is dusted on the fibrous alumina, it is important to dust the lithium salt uniformly on the fibrous alumina.

The temperature of the heat treatment is preferably in the range of 400° to 750° C. Fibrous lithium aluminate can be produced in a relatively short time. When the temperature is lower than 400° C., a longer time is necessary for the reaction. Most preferable temperatures for the heat treatment change depending on the kinds of lithium salts used, for example, 400° to 550° C. in the case of lithium nitrate and 550° to 750° C. in the case of lithium carbonate.

In order to enhance the self-supporting properties of the matrix further, it is desirable to sinter the resulting fibrous lithium aluminate. The sintering temperature is preferably in the range of 800° to 1600° C., more preferably 1000° to 1300° C. A preferable temperature raising rate for sintering is 100° C./hour or less.

As mentioned above, the matrix having self-supporting properties and made of lithium aluminate long fibers can be obtained by contacting a matrix made of fibrous alumina and having a desired shape with a lithium salt, followed by heat treatment to give fibrous lithium aluminate, and if necessary, additional sintering of the resulting fibrous lithium aluminate. The electrolyte body can be formed by filling spaces in the matrix with an alkali metal carbonate. In order to make the inner resistance of the electrolyte body smaller, it is preferable to make the proportion of the electrolyte larger and the proportion of the matrix smaller. Considering mechanical strength of the electrolyte body, the proportion of the lithium aluminate long fibers is preferably 30 to 60% by weight and the proportion of the alkali metal carbonate is preferably 40 to 70% by weight.

Fuel cells comprising an anode, a cathode and the above-mentioned special matrix interposed between the electrodes and containing an electrolyte such as a molten alkali metal carbonate in the spaces of the matrix can be constructed according to a conventional method.

The electrolyte plate according to the present invention permits continuous thermal cycling from ambient conditions to the operating conditions of the fuel cell and use in the form of thin plate without damaging of the matrix.

This invention is illustrated by way of the following Examples.

EXAMPLE 1

Using alumina long fibers having a length of 100 to 400 $\mu$m with a diameter of 1 to 4 $\mu$m, each sheet of felt having dimensions of 100 mm×100 mm with 5 mm thick was produced. Each sheet of felt was dipped in a solution dissolving lithium hydroxide (LiOH.H$_2$O) and stood still for about 5 hours therein. Then, the felt was dried at room temperature for 2 days. The dried felt was placed in an electric furnace and maintained at 550° C. for 5 hours, followed by gradual cooling. The resulting felt was pressed under a pressure of 100 kg/cm$^2$ to give a paper-like shape (an alumina paper) with 0.35 mm thick. The alumina paper was placed in the electric furnace and heated at a rate of 100° C./hour to 800° C. and maintained at that temperature for 10 hours for sintering. The sintered body (matrix) had a porosity of about 63%.

A smooth and thin electrolyte plate was prepared by dusting a mixed carbonate powder of lithium carbonate and potassium carbonate (1:1 by weight) on the above-mentioned matrix uniformly and maintaining the matrix at 550° C. for 1 hour to impregnate vacant spaces in the matrix with the mixed carbonate. The content of the mixed carbonate in the electrolyte plate was 60.5% by weight.

EXAMPLE 2

An alumina paper with 0.33 mm thick was obtained by molding the same felt-like alumina long fibers as used in Example 1 under a pressure of 100 kg/cm$^2$. Lithium carbonate powder was dusted uniformly on the alumina paper and maintained at 750° C. for 10 hours, followed by sintering at 1600° C. for 3 hours.

On the resulting matrix, a mixed carbonate powder of lithium carbonate and potassium carbonate (1:1 by weight) was dusted uniformly and heated at 550° C. for 1 hour to fill the vacant spaces in the matrix with the mixed carbonate to give a smooth and thin electrolyte plate having uniform quality. The content of the mixed carbonate in the electrolyte plate was 59% by weight.

EXAMPLE 3

The same felt-like alumina long fibers as used in Example 1 (100 mm×100 mm, with 5 mm in thickness) was dipped in an aqueous solution of lithium nitrate (concentration 10–25% by weight) for about 5 hours and then dried at room temperature for 2 days. Then the dried felt was placed in an electric furnace and heated at 400° C. for 5 hours. After cooling, an alumina paper with 0.34 mm thick was molded under a pressure of 100 kg/cm$^2$. The alumina paper was placed in the electric furnace and heated at a rate of 100° C./hour 1300° C. and maintained at that temperature for 2 hours for sintering. The resulting matrix had a porosity of about 64%. Then, the matrix was dipped in a molten carbonate bath containing lithium carbonate and potassium carbonate (1:1 by weight) for 10 minutes. Superfluous mixed carbonate attached to the surfaces of the matrix was removed by polishing to give a smooth electrolyte plate. The content of the mixed carbonate in the electrolyte plate was 61% by weight.

Example 4

Using the electrolyte plates obtained in Examples 1, 2 and 3, each unit cell was constructed by a conventional method and cell performance was measured.

As anode and cathode, a sintered plate made of nickel powder was used. An electrolyte plate of 5 cm×5 cm was used and a single cell was constructed. To the anode side, a mixed gas of 70% $H_2$—$N_2$ was supplied and to the cathode side, a mixed gas of 20% $O_2$—20% $CO_2$—$N_2$ was supplied. The reaction temperature was set at 650° C. and a cell voltage was measured by leading a current from terminals from both electrodes via a loading circuit. During the measuring period until 200 hours, the reaction temperature was lowered to room temperature every 50 hours to conduct a heat cycle test. The results are shown in Table 1.

In Comparative Example 1, there was used an electrolyte plate obtained by mixing granular alumina with lithium hydroxide (1:2 by mole), sintering at 450° C., mixing a carbonate in an amount of 60% by weight with the sintered body and press molding to give a thickness of 3 mm.

In Comparative Example 2, there was used an electrolyte plate produced in the same manner as described in Comparative Example 1 except for using the carbonate in an amount of 40% by weight in place of 60% by weight.

TABLE 1

| Electrolyte plate | Cell voltage (at loading 100 mA/cm$^2$) (volts) | | |
|---|---|---|---|
| | Initial time | 100 hrs | 200 hrs |
| Example 1 | 0.70 | 0.70 | 0.72 |
| Example 2 | 0.65 | 0.67 | 0.67 |
| Example 3 | 0.70 | 0.68 | 0.68 |
| Comparative Example 1 | 0.60 | 0.50 | 0.42 |
| Comparative Example 2 | 0.61 | 0.10 | — |

EXAMPLE 5

A sheet of felt (100 mm×100 mm, with 5 mm in thickness) of fibrous alumina having a diameter of 4 μm and a length of 400 μm was dipped in a molten bath of mixed carbonate of lithium carbonate and potassium carbonate (1:1 by weight) heated at 500° C. for about 3 hours. The felt impregnated with the mixed carbonate was compressed under a pressure of 100 kg/cm$^2$ with heating at 470° C. to give an electrolyte plate with 0.7 mm thick. By this method, the conversion of alumina long fibers to lithium aluminate and the filling of the electrolyte material in the vacant spaces in the matrix can be attained at the same time. The content of the mixed carbonate in the electrolyte plate was 70% by weight.

EXAMPLE 6

To alumina long wool, lithium hydroxide and water (LiOH concentration 10-20% by weight), were added and mixed well. The resulting alumina wool was air-dried at room temperature for 2 days, followed by heat treatment at 450° C. for about 5 hours. After dispersing the resulting alumina long filters in an aqueous solution of 2% by weight methylcellulose and filtration thereof, non-woven fabric of 100 mm×100 mm×7 mm (in thickness) was prepared. After air-drying, the non-woven fabric was pressed under a pressure of 500 kg/cm$^2$ to give a plate of 0.5 mm in thickness.

The resulting plate was placed in an electric furnace and heated at a rate of 50° C./hour to 1000° C. and sintered at that temperature for 10 hours. The porosity of the resulting matrix was 82%.

On the resulting matrix, a mixed carbonate powder of lithium carbonate and potassium carbonate (1:1 by weight) was dusted uniformly, followed by heating at 550° C. to melt the mixed carbonate, which was filled vacant spaces of the matrix to give a smooth electrolyte plate uniform in quality.

EXAMPLE 7

The same felt of alumina long fibers as used in Example 5 (300 mm×300 mm, with 5 mm in thickness) was dipped in an aqueous solution of lithium hydroxide (LiOH.H$_2$O) (concentration 10-20% by weight) for about 5 hours, followed by drying at room temperature for 2 days. A large electrolyte plate of 300 mm×300 mm with a thickness of 0.40 mm was prepared in the same manner as described in Example 1.

Each of the structures prepared in Examples 1–7 were utilized in a fuel cell as shown in the drawing. The fuel cell was constructed so as to comprise a housing 10 made of any suitable material such as stainless steel, an electrolyte plate 12 as illustrated in Examples 1–7, an anode 14 and a cathode 16 in contact with opposite surfaces of the electrolyte plate 14.

The electrodes 14 and 16 were plates of palladium-gold alloys intimately contacted with the electrolyte matrix. Air as the oxidant is fed to the cathode from an oxidant supply to a chamber 18 where it contacts the cathode 16. Hydrogen from a fuel storage tank is fed to a chamber 20 where it contacts the anode 14.

Excess oxidant and fuel are exhausted from the cell and electrical energy removed through circuit 22.

What is claimed is:

1. A process for producing an electrolyte retaining matrix which comprises:
    contacting a self-supporting alumina felt or plate, made of alumina long fibers that have been interlocked with each other, with a lithium salt;
    heating the alumina felt or plate in contact with the lithium salt to form a lithium aluminate matrix by the reaction of alumina with the lithium salt; and
    impregnating the lithium aluminate matrix with an alkali carbonate electrolyte to fill spaces in the matrix.

2. A process according to claim 1, wherein the alumina long fibers have sufficient length to provide the interlocking of the long fibers to enable the matrix to be self-supporting.

3. A process according to claim 1, wherein the lithium salt is dusted on the alumina felt or plate to contact the felt or plate with the salt, and wherein the heating is performed at a temperature of at least the melting point of the lithium salt in contact with the alumina long fibers of the alumina felt or plate.

4. A process according to claim 1, wherein the heating is performed at a temperature of 400°-750° C.

5. A process according to claim 1, wherein said alumina felt or plate has been obtained by subjecting the interlocked alumina long fibers to sintering to enhance the mechanical strength of the felt or plate.

6. A process according to claim 5, wherein said sintering is performed at a temperature in the range of 800°-1600° C.

7. A process according to claim 1, wherein the lithium aluminate long fibers formed by the reaction of alumina with the lithium salt have a length of 100 μm or more and a ratio of length (l) to diameter (d), l/d, of 10 or more.

8. A process for producing an electrolyte retaining matrix which comprises:
   interlocking long fibers of electrical insulating material so as to form a matrix of interlocked insulating long fibers; and
   subjecting the interlocked insulating long fibers to sintering so as to enhance the mechanical strength of the matrix, the sintered matrix having vacant spaces for filling with an electrolyte, whereby the matrix formed is self-supporting.

9. A process according to claim 8, wherein said insulating material is lithium aluminate.

10. A process according to claim 9, wherein said sintering is performed at a temperature between 800° and 1600° C.

11. A process according to claim 8, comprising the further step of impregnating the interlocked insulating long fibers with a molten electrolyte so as to fill vacant spaces in the matrix.

12. A process according to claim 11, wherein the further step of impregnating is performed after the interlocked insulating long fibers have been subjected to sintering.

13. A process according to claim 11, wherein said molten electrolyte is a molten carbonate electrolyte.

14. A process according to claim 13, wherein said insulating material is lithium aluminate.

* * * * *